United States Patent
Hosoya et al.

[11] Patent Number: 5,916,131
[45] Date of Patent: Jun. 29, 1999

[54] APPARATUS FOR PURIFYING ENGINE EXHAUST GAS

[75] Inventors: Yasuhiko Hosoya; Toshiki Kuroda; Tatsuhiko Takahashi; Mutsuo Sekiya, all of Hyogo, Japan

[73] Assignee: Mitsubishi Denki Kabushiki Kaisha, Tokyo, Japan

[21] Appl. No.: 08/385,984

[22] Filed: Feb. 9, 1995

Related U.S. Application Data

[62] Division of application No. 08/094,264, Jul. 21, 1993, Pat. No. 5,425,235.

[30] Foreign Application Priority Data

| Jul. 21, 1992 | [JP] | Japan | P.HEI 4-193980 |
| Jul. 21, 1992 | [JP] | Japan | P.HEI 4-193981 |
| Jul. 21, 1992 | [JP] | Japan | P.HEI 4-193982 |

[51] Int. Cl.$^6$ .................................................. F01N 3/00
[52] U.S. Cl. .................... 60/289; 60/300; 60/284
[58] Field of Search ...................... 60/289, 290, 274, 60/300, 284

[56] References Cited

U.S. PATENT DOCUMENTS

| 2,937,490 | 5/1960 | Calvert | 60/284 |
| 3,503,716 | 3/1970 | Berger | 60/289 |
| 3,776,205 | 12/1973 | Maruoka | 60/284 |
| 3,779,015 | 12/1973 | Maruoka | 60/289 |
| 3,962,867 | 6/1976 | Ikeura | 60/289 |
| 3,963,444 | 6/1976 | Yamada | 60/289 |
| 4,098,078 | 7/1978 | Laurent | 60/289 |

FOREIGN PATENT DOCUMENTS

| 2306471 | 8/1974 | Germany . |
| 3144706 | 12/1982 | Germany . |
| 3919343 | 12/1990 | Germany . |
| 47-33956 | 11/1972 | Japan . |
| 52-110320 | 9/1977 | Japan . |
| 56-60813 | 5/1981 | Japan . |

*Primary Examiner*—Thomas E. Denion
*Attorney, Agent, or Firm*—Sughrue, Mion, Zinn, Macpeak & Seas, PLLC

[57] ABSTRACT

The air introducing means comprising air pump for introducing air into exhaust pipe and heating device for heating the introduced air are provided. Both an air pump for introducing air into exhaust pipe and a heating device for heating the introduced air are provided. Heating device is connected to the control unit which causes it to stop heating when the temperature of the water for cooling engine exceeds a preset temperature. Idle rotation regulator for keeping the rotational speed of the engine at a level higher than the idling speed is also provided. Further provided is a control unit that actuates the idle rotation regulator when the engine is brought to idling while the heating device performs heating. If the rotational speed of the engine is increased while it is running at idle, more power is generated by dynamo to make up for the power consumption by the heating device.

1 Claim, 4 Drawing Sheets

FIG. 6(a) CONTROL POWER SUPPLY

FIG. 6(b) CONTROLLING OF A HEAT DEVICE

FIG. 6(c) CONTROLLING OF ON AIR PUMP AND A CONTROL VALVE

APPARATUS FOR PURIFYING ENGINE EXHAUST GAS

This is a divisional of application Ser. No. 08/094,264 filed Jul. 21, 1993 now U.S. Pat. No. 5,425,235.

BACKGROUND OF THE INVENTION

The present invention relates to an apparatus for purifying the exhaust gas from an engine by means of a catalyst.

While various apparatus are conventionally used to purify the exhaust gas from an engine by means of a catalyst, there is available a model in which heated air is introduced at a point upstream of the catalyst to insure that the catalyst temperature is elevated as fast as possible after engine start-up, thereby enhancing the efficiency of purification. If heated air is introduced into the exhaust pipe right after the engine is started and when the catalyst temperature and, hence, the purification efficiency are still low, the introduced hot air will heat the catalyst and, at the same time, the reaction involving the oxidation of HC and CO in the exhaust gas is accelerated by the catalyst, thereby causing a rapid increase in the temperature of the catalyst.

Figure 2:
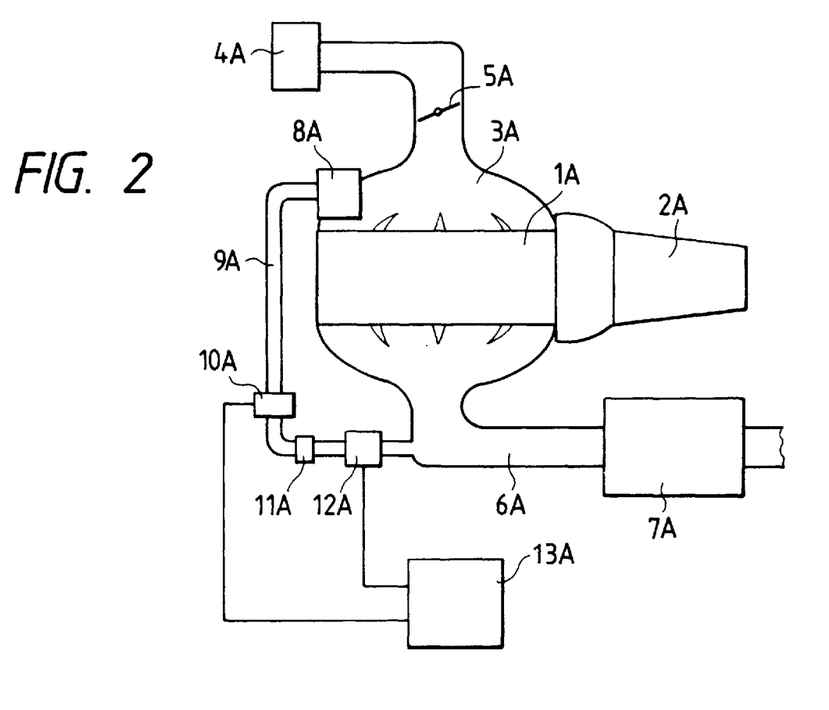
FIG. 2 shows schematically the layout of a conventional apparatus for purifying the exhaust gas from an engine.
Figure 3:
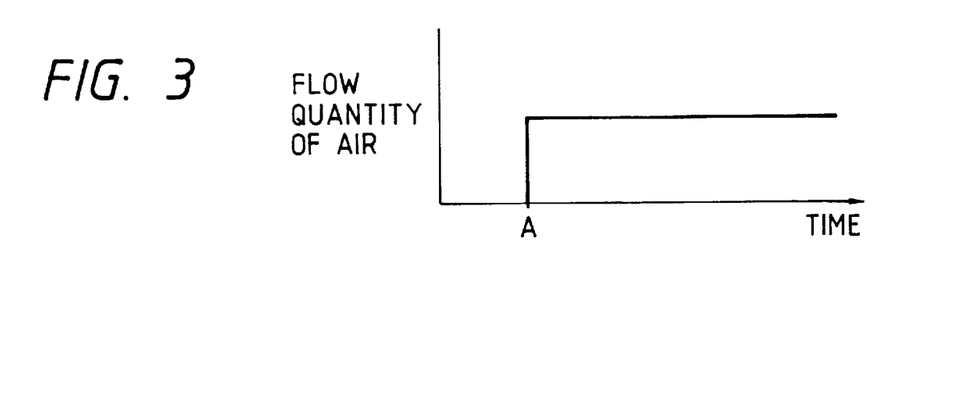
FIG. 3 is a graph showing the flow quantity of air that is introduced into the exhaust pipe.

A conventional exhaust gas purifier of the type under consideration is described below with reference to FIGS. 2 and 3. FIG. 2 shows schematically the layout of the conventional apparatus for purifying the exhaust gas from an engine, and FIG. 3 is a graph showing the flow quantity of air that is introduced into the exhaust pipe.

In FIG. 2, reference numeral 1A denotes the engine, 2A is the transmission of engine 1A, and 3A is a suction pipe. The portion upstream of the suction path formed by suction pipe 3A communicates with the atmosphere via air cleaner 4A.

Shown by 5A is a throttle valve that controls the quantity of air to be sucked into engine 1A. Engine 1A is so adapted that it is supplied with a fuel by means of an injector (not shown). Shown by 6A is the exhaust pipe and catalyst 7A for purifying the exhaust gas by a chemical reaction is provided downstream of the exhaust pipe 6A.

Shown by 8A is an air pump for introducing air into the exhaust pipe 6A. This air pump 8A is of a mechanical type that is driven by engine 1A and the air discharge port of the pump communicates with the exhaust pipe 6A at the portion upstream of the catalyst 7A via an air introducing pipe 9A, a control valve 10A, a check valve 11A, a heater 12A, etc. The air suction port of pump 8A either opens to the atmosphere or communicates with the suction path.

Control valve 10A is so adapted that it will open and close the air channel communicating with the air discharge port of air pump 8A and the opening or closing action of the valve 10A is controlled by a control unit 13A to be described later. Check valve 11A is so adapted that it will permit the selective passage of air from air pump BA toward exhaust pipe 6A, thereby preventing the exhaust gas from leaking out of the exhaust pipe 6A to enter the air pump 8A. The heating device 12A is fitted with a heater (not shown) that generates heat when an electric current is applied and it is so adapted as to heat the air flowing through the above-mentioned air channel. The application of an electric current through the heating device 12A is controlled by the control unit 13A as is the control valve 10A.

The control unit 13A is so adapted that when the start switch (not shown) for engine 1A is turned on, it will open the control valve 10A while causing an electric current to be applied to the heating device 12A.

Being thus constructed, the exhaust gas purifier of the present invention is operated in the following manner. When engine 1A is started, air pump 8A starts to work and, at the same time, control valve 10A opens, whereupon air is ejected from air pump 8A and flows through air introducing pipe 9A, control valve 10A, check valve 11A and heating device 12A to be introduced into the exhaust pipe 6A at the point upstream of the catalyst 7A. The change in the quantity of air thus introduced is shown in FIG. 3. Symbol A in FIG. 3 denotes the time of engine start-up. As shown, the quantity of air introduced into the exhaust pipe 6A is generally constant after engine start-up if the engine is running at constant rpm.

If engine 1A is started, control unit 13A will cause an electric current to flow through the heating device 12A, so the air discharged from the air pump 8A is heated with the device 12A before it is introduced into the exhaust pipe 6A.

The heated air thus introduced into the exhaust pipe 6A is mixed with the exhaust gas in the exhaust pipe 6A and the resulting mixture flows into the catalyst 7A. When both the exhaust gas and the heated air flow into the catalyst 7A, the latter is heated by the hot air while, at the same time, HC and CO in the exhaust gas are converted to $H_2O$ and $CO_2$ by $O_2$ in the heated air. In other words, the heat of the hot air and the heat of reaction are effectively used to raise the temperature of catalyst 7A as soon as the engine is started.

The problem with the exhaust gas purifier having the construction described above is that the engine 1A must be equipped with a dynamo and a battery of large capacity. This is because the heating device 12A consumes large power and an electric current is kept applied to it throughout the period from engine start-up to its stop.

The problem with the engine 1B equipped with the conventional exhaust gas purifier is that its rotational speed is prone to drop while heated air is introduced into the exhaust pipe 6B. This is because the heating device 12B consumes large power and when it performs heating, the dynamo generates more power to increase the load on the engine 1B. Stated more specifically, if engine 1B is brought to idling, its rotational speed is not usually constant and it is prone to run inconsistently. Furthermore, if the rotational speed of the idling engine decreases, the electric power to be charged into the battery tends to be insufficient.

Figure 7:
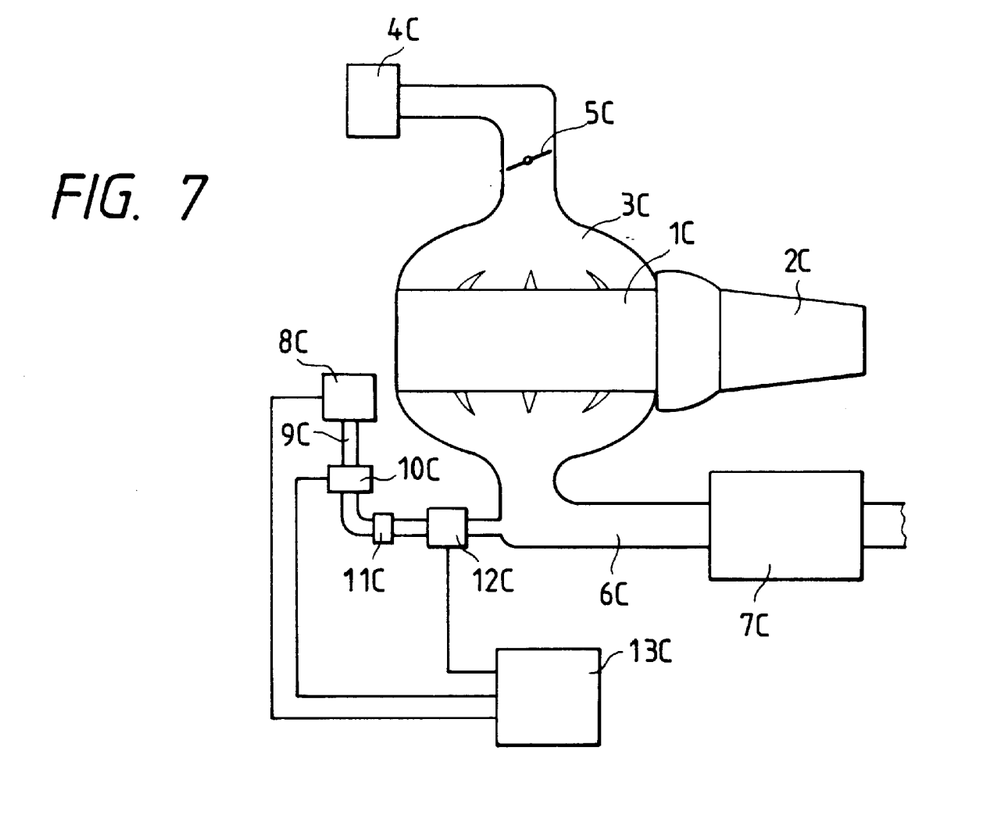
FIG. 7 shows schematically the layout of a conventional apparatus for purifying the exhaust gas from an engine.
Figure 8:
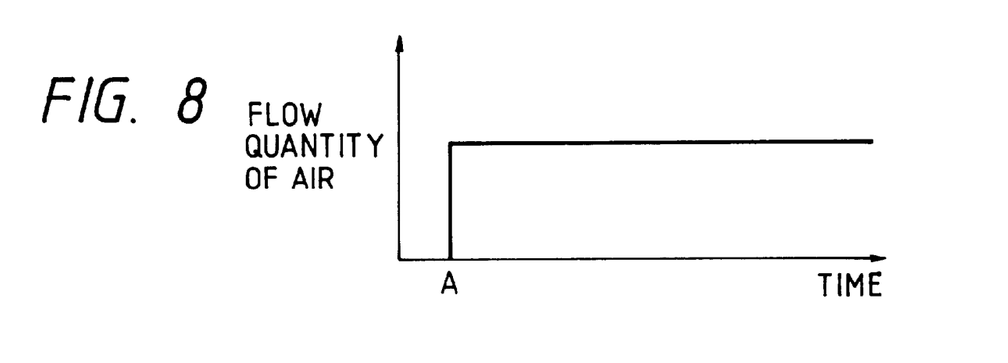
FIG. 8 is a graph showing the flow quantity of air that is introduced into the exhaust pipe.

A conventional exhaust gas purifier of the type under consideration is described below with reference to FIGS. 7 and 8. FIG. 7 shows schematically the layout of the conventional apparatus for purifying the exhaust gas from an engine, and FIG. 8 is a graph showing the flow quantity of air that is introduced into the exhaust pipe.

In FIG. 7, reference numeral 1C denotes the engine, 2C is the transmission of engine 1C, and 3C is a suction pipe. The portion upstream of the suction path formed by suction pipe 3C communicates with the atmosphere via air cleaner 4C.

Shown by 5C is a throttle valve that controls the quantity of air to be sucked into engine 1C. Engine 1C is so adapted that it is supplied with a fuel by means of an injector (not shown). Shown by 6C is the exhaust pipe and catalyst 7C for purifying the exhaust gas by a chemical reaction is provided downstream of the exhaust pipe 6C.

Shown by 8C is an air pump for introducing air into the exhaust pipe 6C. The air pump 8C is of a type that is driven electrically and the air discharge port of the pump communicates with the exhaust pipe 6C at the portion upstream of the catalyst 7C via an air introducing pipe 9C, a control valve 10C, a check valve 11C, a heating device 12C, etc. The operation of the air cleaner pump 8C is controlled by controller 13C to be described hereinafter. The air suction port of pump 8C either opens to the atmosphere or communicates with the suction path.

Control valve 10C is so adapted that it will open and close the air channel communicating with the air discharge port of air pump 8C and the opening or closing action of the valve 10C is controlled by the controller unit 13C. Check valve 11C is so adapted that it will permit the selective passage of air from air pump 8C toward exhaust pipe 6C, thereby preventing the exhaust gas from leaking out of the exhaust pipe 6C to enter the air pump 8C.

The heating device 12C is fitted with a heater (not shown) that generates heat when an electric current is applied and it is so adapted as to heat the air flowing through the above-mentioned air channel. The application of an electric current through the heating device 12C is controlled by the control unit 13C as are the air pump 8C and control valve 10C.

The controller 13C is so adapted than when the start switch (not shown) for engine 1C is turned on, it will open the control valve 10C while causing an electric current to be applied to both air pump 8C and heating device 12C. The controll unit 13C is also adapted in such a way that when the running of the engine satisfies prescribed conditions (which are hereunder referred to as "present conditions"), it will close the control valve 10C while causing both air pump 8C and heating device 12C to stop operating. Another feature of the controll unit 13C is that when the engine 1C stops running, it will close the control valve 10C while causing both air pump 8C and heating device 12C to stop operating.

Being thus constructed, the exhaust gas purifier of the present invention is operated in the following manner. When engine 1C is started, control valve 10C is opened and, at the same time, both air pump 8C and heating device 12C start to operate, whereupon air is ejected from air pump 8C and flows through air introducing pipe 9C, control valve 10C, check valve 11C and heating device 12C to be introduced into the exhaust pipe 6C at the point upstream of the catalyst 7C.

The air ejected from air pump 8C is heated in the heating device 12C before it is introduced into the exhaust pipe 6C. The change in the quantity of air thus introduced is shown in FIG. 8. Symbol A in FIG. 8 denotes the time of engine start-up. As shown, the quantity of air introduced into the exhaust pipe 6C is generally constant after engine start-up.

The heated air thus introduced into the exhaust pipe 6C is mixed with the exhaust gas in the exhaust pipe 6C and the resulting mixture flows into the catalyst 7C. When both the exhaust gas and the heated air flow into the catalyst 7C, the latter is heated by the hot air while, at the same time, HC and CO in the exhaust gas are converted to $H_2O$ and $CO_2$ by $O_2$ in the heated air. In other words, the heat of the hot air and the heat of reaction are effectively used to raise the temperature of catalyst 7C as soon as the engine is started.

If the engine 1C stops running or the state of its running satisfies the present conditions, controll unit 13C closes the control valve 10C while, at the same time, it cause both air pump 8C and heating device 12C to stop operation.

The problem with the conventional exhaust gas purifier having the construction described above is that the durability of the heating device 12C and other devices or components that are located around the heating device 12C is low. This is because when the heating action of the heating device 12C is stopped, air pump 8C is also allowed to stop operating. Hence, even if the application of an electric current to the heating device 12C is cut off, its thermal inertia will warm the heating device 12C and other devices or components that surround it.

SUMMARY OF THE INVENTION

The present invention has been accomplished under these circumstances and has as an object providing an engine exhaust purifier that is capable of rapid heating of the catalyst after engine start-up while keeping the power consumption to a satisfactorily low level.

To attain this object, there is provided according to the first aspect of the present invention an apparatus for purifying the exhaust gas from an engine that comprises an air introducing means for introducing air at a point upstream of the catalyst in an exhaust pipe and a heating device for heating said air, said heating device being connected to a control unit that causes said heating device to stop heating when the engine temperature exceeds a prescribed level.

According to its second aspect, the present invention provides an apparatus for purifying the exhaust gas from an engine that comprises an air introducing means for introducing air at a point upstream of the catalyst in an exhaust pipe and a heating device for heating said air, said air introducing means and said heating device being connected to a control unit which, when the engine temperature exceeds a prescribed level, causes said air introducing means to stop introducing air while, at the same time, causing said heating device to stop heating.

An electric current is applied to the heating device only for the period from engine start-up to the time when the engine temperature reaches a prescribed level and, hence, the time over which current is applied to the heating device is shortened to reduce the required power consumption.

The present invention has been accomplished under these circumstances and has as an object providing an engine exhaust gas purifier that allows the idling engine to run at a consistent rotational speed even when the heating device performs heating and which also insures adequate charging of the battery during idling.

To attain this object, there is provided according to the first aspect of the present invention an apparatus for purifying the exhaust gas from an engine that comprises an air introducing means for introducing air at a point upstream of the catalyst in an exhaust pipe, an electric heating device for heating said air, a rotational speed changer that keeps the rotational speed of the engine at a value higher than the idling speed, and a control unit that actuates said rotational speed changer when the engine is brought to idling while the heating device performs heating.

According to its second aspect, the present invention provides an apparatus for purifying the exhaust gas from an engine that comprises an air introducing means for introducing air at a point upstream of the catalyst in an exhaust pipe with the aid of a motor-driven air pump, an electric heating device for heating said air, a rotational speed changer that keeps the rotational speed of the engine at a value higher than the idling speed, and a control unit that actuates said rotational speed changer when the engine is brought to idling while said air pump is actuated and said heating device performs heating.

If the rotational speed changer is actuated to increase the rotational speed of the engine while it is idling, more power is generated by the dynamo to make up for the power consumption by the exhaust gas purifier.

The present invention has been accomplished under these circumstances and has as an object providing an engine exhaust gas purifier that is protected against deterioration in the endurance of the heating device and other devices or components that are located around it.

To attain this object, the present invention provides an apparatus for purifying an engine exhaust gas that comprises an air introducing means for introducing air at a point upstream of the catalyst in an exhaust pipe and a heating device for heating said air, said air introducing means being connected to a control unit that allows said means to continue the introduction of air for a specified time after the heating device no longer performs heating.

The air introducing means continues to introduce air even after the heating device stops operating and, hence, the heating device is deprived of heat by the introduced air and eventually cools down.

DETAILED DESCRIPTION OF THE PREFERRED EMBODIMENTS

EXAMPLE 1A

An embodiment of the first aspect of the present invention is described below in detail with reference to FIG. 1.

Figure 1:
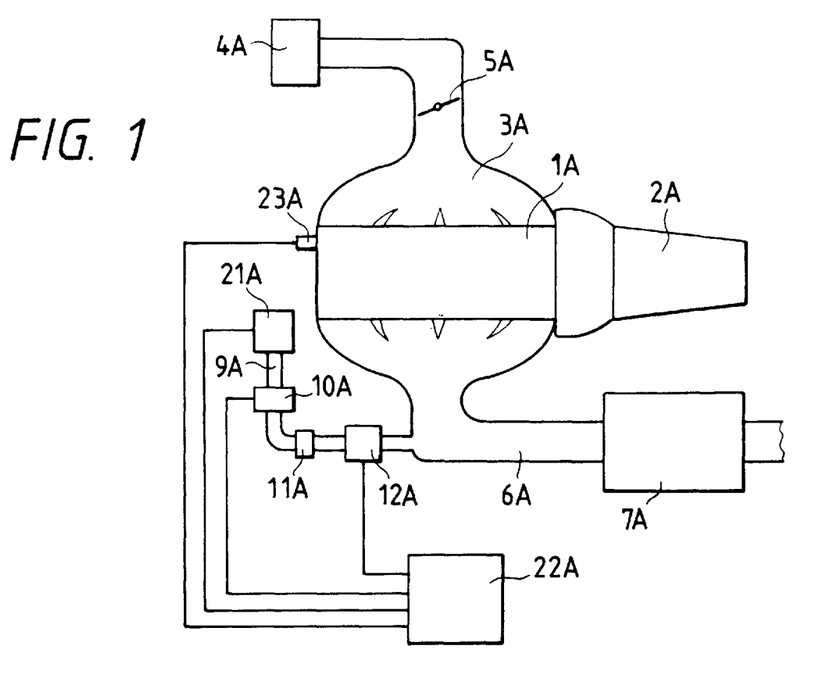
FIG. 1 shows schematically the layout of the engine exhaust gas purifier of the present invention.

FIG. 1 shows schematically the layout of the engine exhaust purifier of the present invention. Those components of the purifier which are identical or equivalent to those shown in FIG. 2 are identified by like numerals and will not be described below in detail.

Referring to FIG. 1, 21A is an air pump for introducing air into exhaust pipe 6A. Unlike the conventional mechanical type, this air pump 21A is driven electrically. The air introducing means as an essential part of the purifier comprises air pump 21A, control valve 10A, check valve 11A, etc.

Shown by 22A is a control unit for controlling the action of air pump 21A, control valve 10A, heating device 12A, etc. The control unit 22A is connected not only to the above-mentioned devices or parts to be controlled but also to a temperature sensor 23A that detects the temperature of the water for cooling engine 1A so that it can control those devices or parts in accordance with the temperature of the cooling water as detected by said sensor 23A. The term "engine temperature" as used in the present invention means the temperature of the cooling water as far as Example 1A is concerned. The construction of the control unit 22A is described below in detail.

The control unit 22A starts to work when the start switch (not shown) of the engine 1A is turned on and it then compares the temperature of the cooling water as detected by sensor 23A with a prescribed temperature (which is hereunder referred to as the "preset temperature"). An example of the preset temperature is the temperature of the cooling water that is reached when engine warm-up ends to bring the engine 1A to steady-state running. If the temperature of the cooling water is below the preset temperature, an electric current is applied to both air pump 21A and heating device 12A while, at the same time, control valve 10A is opened. If the temperature of the cooling water becomes higher than the preset temperature (for example, at about 50° C.), the application of electric current to the heating device 12A is interrupted.

If engine 1A as equipped with the purifier under consideration is started and before its warm-up ends, air pump 21A is driven and air flows through air introducing pipe 9A, control valve 10A, check valve 11A and heating device 12A so that it is introduced from the air pump 21A into the exhaust pipe 6A. If engine warm-up ends to bring the engine 1A to steady-state running, the heating operation of the heating device 12A stops.

Engine 1A to be used in Example 1A is fitted with a dynamo (not shown) of a well-known design that is coupled to the crankshaft (also not shown) and which is to be driven by the engine 1A. The power generated by the dynamo is partly stored in a battery (not shown) and partly supplied to the various devices and components of the exhaust gas purifier.

The operation of the exhaust gas purifier of the present invention is described below in greater detail. When the start switch for engine 1A is turned on, the engine 1A starts to run and the control unit 22A will compare the temperature of the cooling water with the preset temperature. If the detected temperature of the cooling water is below the preset temperature, the devices and parts under the control of the control unit 22A are operated in such a way that air is introduced from air pump 21A into the exhaust pipe 6A. At the same time, an electric current is applied to the heating device 12A, thereby heating the introduced air.

When the heated air is thus introduced into the exhaust pipe 6A at the point upstream of the catalyst, the temperature of the catalyst 7A is elevated in the same manner as in the prior art, namely, by the heat of the hot air and by the heat of reaction that develops when HC and CO in the exhaust gas undergo oxidative reaction with the oxygen in the heated air.

If engine warm-up ends to bring the engine 1A to steady-state running and when the temperature of the cooling water exceeds the preset temperature, the control unit 22A detects that fact and interrupts the application of electric current to the heating device 12A. In this situation, air pump 21A is the major power-consuming device in the exhaust gas purifier under consideration. Therefore, the purifier of the present invention, which permits and electric current to be applied to the heating device 12A only for the period from engine start-up to the time when the temperature of the cooling water reaches the preset temperature, offers the advantage that the time period of current application to the heating device 12A is shortened to reduce the required power consumption.

EXAMPLE 2A

Example 1A concerns the case where the temperature of the cooling water is regarded as the engine temperature which is an index for the control of current application to the heating device 12A. However, this is not the sole case of the present invention and the engine temperature may be detected in terms of other factors, such as the temperature of the lubricant on the engine 1A.

When using the temperature of the lubricant, a temperature sensor is installed either in the oil pan situated at the bottom of engine 1A or near the lubricant channel within the engine 1A so that the detecting portion of the sensor will contact the lubricant.

In the next place, the engine exhaust gas purifier according to the second aspect of the present invention is described below. The apparatus for use in implementing the second aspect of the invention can be realized merely by altering the internal program of the control unit 22A in the exhaust gas purifier shown in FIG. 1 and, hence, the following description of that apparatus is based on FIG. 1.

The engine exhaust gas purifier according to the second aspect of the present invention is so adapted that at the time the warm-up of the engine 1A ends, the action of air pump 21A for introducing air into the exhaust pipe 6A is also ceased. This is accomplished in the following manner: when the control unit 22A interrupts the application of electric current to the heating device 12A upon detecting the fact that the temperature of the cooling water has exceeded the present temperature, the control unit 22A also stops the air pump 21A while, at the same time, it closes the control valve 10A.

Thus, both actions of introducing air and heating it are caused to stop at the time when engine warm-up ends. If this is done, the power consumption by the exhaust gas purifier is reduced to a very low level while, at the same time, one can prevent the exhaust gas from becoming oxygen-rich on account of the air that is introduced when the engine 1A is running in a steady state.

The action of introducing air can also be stopped by closing only the control valve 10A. If the control valve 10A is used to control the quantity of air to be introduced, one can attain the intended object by opening or closing the control valve 10A; therefore, even after the engine warm-up ends, air can be introduced in a flow quantity that is adapted for the actual state of engine running. If control is made in this manner, the exhaust gas flowing upstream of the catalyst can be brought to a state where the efficiency of exhaust purification is the highest in the catalyst 7A.

As described on the foregoing pages, the apparatus for purifying the engine exhaust gas according to the first aspect of the present invention comprises the air introducing means for introducing air at a point upstream of the catalyst in the exhaust pipe and the heating device for heating said air, and this heating device is connected to the control unit which causes said heating device to stop heating when the engine temperature exceeds a prescribed level. The apparatus for purifying the engine exhaust gas according to the second aspect of the present invention comprises the air introducing means for introducing air at a point upstream of the catalyst in the exhaust pipe and the heating device for heating said air, and both the air introducing means and the heating device are connected to the control unit which, when the engine temperature exceeds a prescribed level, causes said air introducing means to stop introducing air while, at the same time, causing said heating device to stop heating. In either type of apparatus, an electric current is applied to the heating device only for the period from engine start-up to the time when the engine temperature reaches a prescribed level and, hence, the time over which current is applied to the heating device is shortened to reduce the required power consumption.

As a result, the purifier of the present invention can be operated with a dynamo and a battery that are small in capacity and size. In addition, the heating device to which an electric current need be applied for a shorter time has a longer service life and, hence, its effectiveness—using heated air to increase the catalyst temperature as soon as the engine is started, thereby enhancing the efficiency of exhaust gas purification—can be maintained over a prolonged time.

Furthermore, the power generation by the dynamo can be set at low level and, hence, the engine load can be sufficiently reduced to save on the required fuel consumption.

EXAMPLE 1B

An embodiment of the present invention is described below in detail with reference to FIG. 4.

Figure 4:
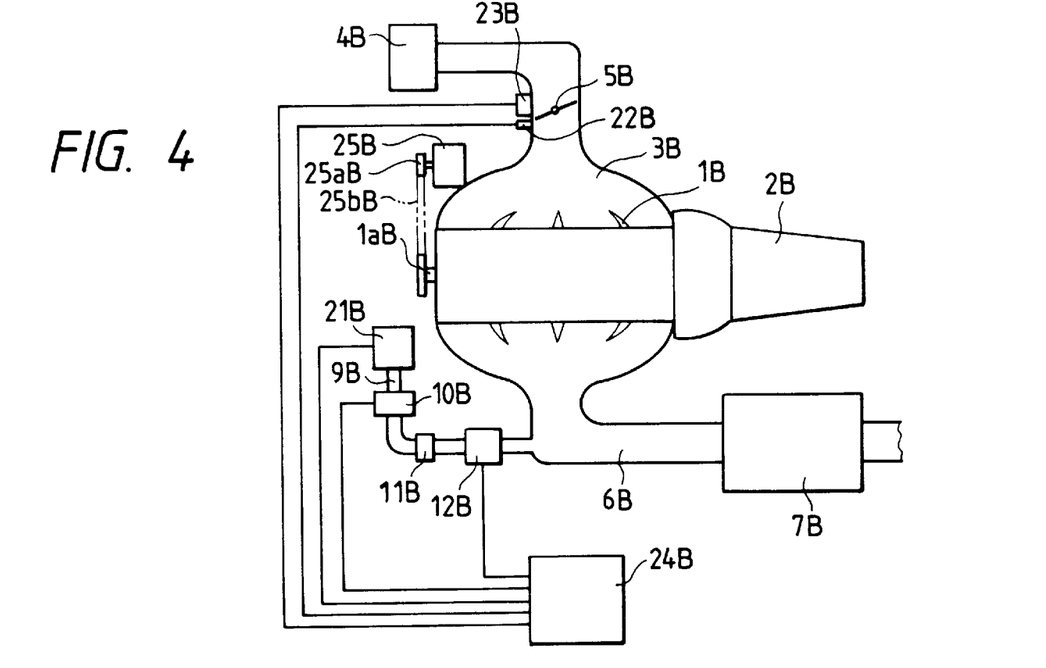
FIG. 4 shows schematically the layout of the engine exhaust gas purifier of the present invention.

FIG. 4 shows schematically the layout of the engine exhaust gas purifier of the present invention. Those components of the purifier which are identical or equivalent to those shown in FIG. 2 are identified by like numerals and will not be described below in detail.

Referring to FIG. 4, 21B is an air pump for introducing air into the exhaust pipe 6B. Unlike the conventional mechanical type, this air pump 21B is driven electrically. The air introducing means as an essential part of the purifier comprises this air pump 21B, control valve 10B, check valve 11B, etc.

Shown by 22B is an idle switch for detecting the fact that engine 1B has been brought to idling. This idle switch 22B is of a type that detects the position of a throttle valve 5B and it is so adapted that when engine 1B has been brought to idling, a detection signal is delivered to the control unit which is described hereafter.

Shown by 23B is an idle rotation regulator that works as the rotational speed changer for increasing the rotational speed of the engine. This idle rotation regulator 23B is adapted to keep the rotational speed of the engine at a value higher than the idling speed by a suitable method such as changing the opening of throttle valve 5B or varying the amount of adjustment by a well-known idling regulator (not shown) that may be provided in the neighborhood of the throttle valve 5B. The operation of the idle rotation regulator 23B is controlled by the control unit to be described below.

Shown by 24B is the control unit for controlling the idle rotational regulator 23B. This control unit 24B is so adapted that it controls not only the idle rotation regulator 23B but also the operation of air pump 21B, control valve 10B, heating device 12B, etc. in a conventional manner. The control unit 24B is connected not only to the above-mentioned devices or parts to be controlled but also to the idle switch 22B so that the idle rotation regulator 23B is actuated in the direction for increasing the rotational speed of the engine while an electric current is applied to the heating device 12B and when the control unit 24B is supplied with an idling detection signal from the idle switch 22B.

The control unit 24B to be used in the embodiment under consideration is so adapted that it cuts off the application of electric current to the heating device 12B if the engine, after it was started up, attains a state that satisfies prescribed conditions. The control unit 24B is also adapted so that when the heating device 12B no longer performs heating, said control unit will not perform the above-described control on the idle rotation regulator 23B even if it is supplied with a detection signal from the idle switch 22B.

Shown by 25B is the dynamo and the follower pulley 25aB of dynamo 25B is coupled to the crankshaft 1aB of the engine 1B via belt 25bB and the like. The power generated by the dynamo 25B is partly stored in a battery (not shown) and partly applied to the various devices and components of the exhaust gas purifier.

We now describe the operation of the exhaust gas purifier of the present invention. When the start switch for engine 1B is turned on, the engine 1B starts to run and the control unit 24B will actuate air pump 21B, control valve 10B and heating device 12B so that heated air will be introduced into the exhaust pipe 6B.

When the heated air is thus introduced into the exhaust pipe 6B at the point upstream of the catalyst, the temperature of the catalyst 7B is elevated in the same manner as in the prior art, namely, by the heat of the hot air and by the heat of reaction that develops when HC, CO, etc. in the exhaust gas undergo oxidative reaction with the oxygen in the exhaust gas.

Immediately after its start-up, engine 1B is allowed to run with heated air introduced into the exhaust pipe 6B as described above. When engine 1B is brought to idling, idle switch 22B detects that fact and delivers a detection signal to the control unit 24B.

Upon receiving that detection signal, the control unit 24B actuates the idle rotation regulator 23B in the direction for increasing the rotational speed of the engine if an electric current is being applied to the heating device 12B. If the heating device 12B does not perform heating, the control unit 24B will not actuate the idle rotation regulator 23B in the direction for increasing the rotational speed of the engine even if said unit is supplied with the detection signal from the idle switch 22B. Thus, the rotational speed of engine 1B at idle while an electric current is applied to the heating device 12B will be higher than when no current is applied to the heating device 12B.

Therefore, if the idle rotation regulator 23B is actuated to increase the rotational speed of the engine while it is idling, more power is generated by the dynamo to make up the power consumption by the heating device 12B.

In the next place, the engine exhaust gas purifier according to the second aspect of the present invention is described below. The apparatus for use in implementing the second aspect of the invention can be realized merely by altering the internal program of the control unit 24B in the exhaust gas purifier shown in FIG. 4 and, hence, the following description of that apparatus is based on FIG. 4.

The control unit 24B used in the engine exhaust gas purifier according to the second aspect of the present invention is so adapted that it will actuate the idle rotation regulator 23B if it is supplied with an idle detection signal from idle switch 22B while air pump 21B is in operation or heating device 12B performs heating. The control unit 24B constructed in the manner described above insures that as long as air pump 21B is in operation, the rotational speed of engine 1B is increased if it is brought to idling and this advantage is attained even if the heating device 12B no longer heats air. As a consequence, the control unit 24B prevents the rotational speed of the engine from decreasing on account of power consumption by the motor-driven air pump 21B.

As described on the foregoing pages, the apparatus for purifying the engine exhaust gas according to the first aspect of the present invention comprises the air introducing means for introducing air at a point upstream of the catalyst in the exhaust pipe, the electric heating device for heating said air, the rotational speed changer that keeps the rotational speed of the engine at a value higher than the idling speed, and the control unit that actuates said rotational speed changer when the engine is brought to idling while the heating device performs heating. The apparatus for purifying the engine exhaust gas according to the second aspect of the present invention comprises the air introducing means for introducing air at a point upstream of the catalyst in the exhaust pipe with the aid of a motor-driven air pump, the electric heating device for heating said air, the rotational speed changer that keeps the rotational speed of the engine at a value higher than the idling speed, and the control unit that actuates said rotational speed changer when the engine is brought to idling while said air pump is actuated and said heating device performs heating. If the rotational speed changer in either type of apparatus is actuated to increase the rotational speed of the engine while it is idling, more power is generated by the dynamo to make up for the power consumption by the exhaust gas purifier.

As a result, the rotation of the engine can be stabilized even if it is brought to idling while the heating device performs heating; furthermore, charging into the battery can positively be performed during idling.

EXAMPLE 1C

An embodiment of the present invention is described below in detail with reference to FIGS. 5 and 6.

Figure 5:
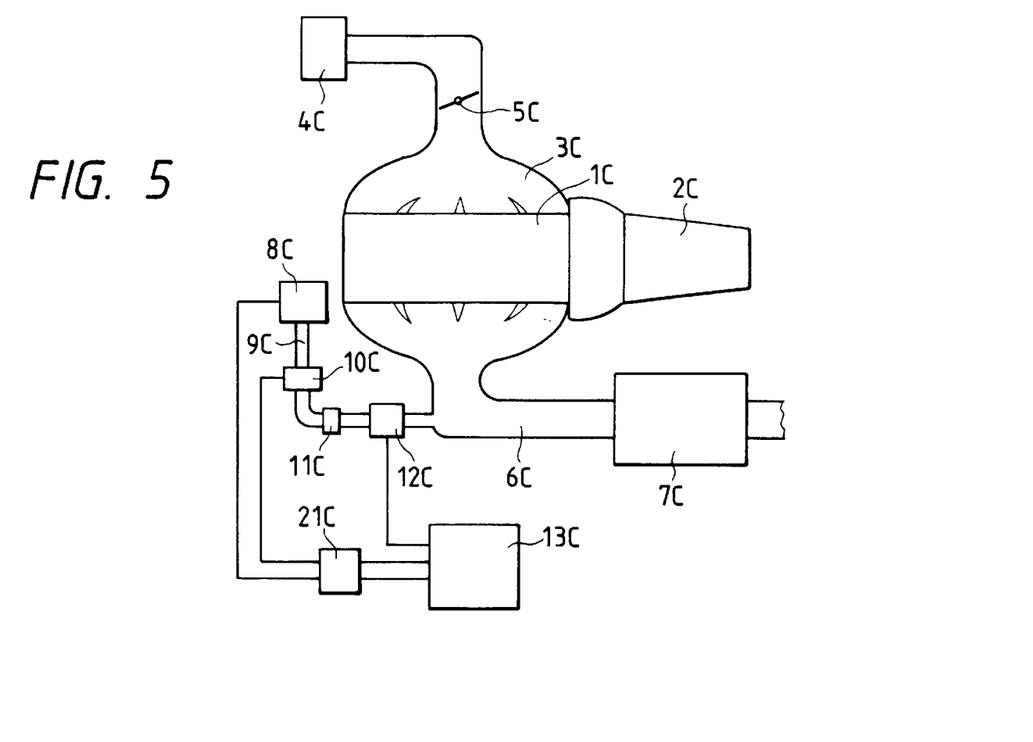
FIG. 5 shows schematically the layout of the engine exhaust gas purifier of the present invention.
Figure 6A:
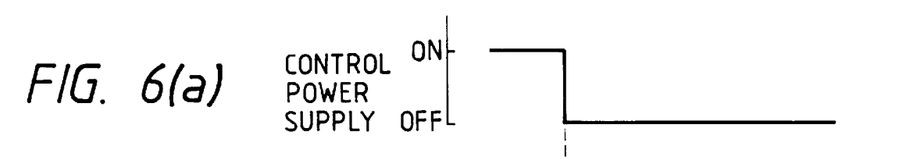
FIGS. 6(a)–6(c) is a control charge showing the operation of the engine exhaust gas purifier of the present invention.
Figure 6B:
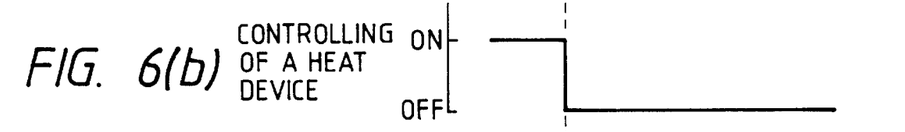
Figure 6C:
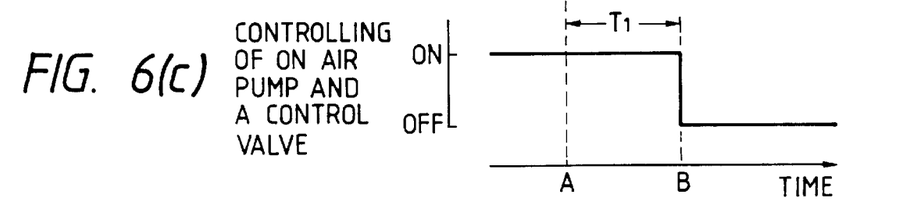

FIG. 5 shows schematically the layout of the engine exhaust gas purifier of the present invention, and FIG. 6 is a control chart showing the operation of the engine exhaust gas purifier of the present invention. Those components of the purifier shown in FIG. 5 which are identical or equivalent to those shown in FIG. 7 are identified by like numerals and will not be described below in detail.

Referring to FIG. 5, 21C is a delay control device that works as the control unit which is one of the essential parts of the present invention. In terms of electric circuit, the delay control device 21C is inserted between controller 13C and each of air pump 8C and control valve 10C. The delay control device 21C is so adapted that after the controller 13C has caused the heating device 12C to stop operating, it controls both air pump 8C and control valve 10C which constitute part of the air introducing means which is another essential portion of the present invention. It should be noted here that the air introducing means is composed of air pump 8C, control valve 10C, check valve 11C, etc.

The delay control device 21C performs control in such a manner that for a specified time after the stopping of heating device 12C, air pump 8C is kept in operation and, at the same time, control valve 10C is opened. The control in this manner is hereunder referred to simply as "delay control".

The controller 13C used in the present invention is so adapted that when the application of an electric current to heating device 12C is cut off since engine 1C stops or the state of its running satisfies the present conditions, a control start signal is also delivered to the delay control device 21C. Thus, the delay control device 21C is such that when a specified time has passed since its supply with the aforementioned control start signal, it causes the air pump 8C to stop operating while, at the same time, it closes the control valve 10C.

The use of the control start signal is not the sole method of starting the control with the delay control device 21C and other techniques may be employed as appropriate, such as starting the control at the time when the power source for driving the pump and the valve is disconnected from the delay control device 21C.

With the introduction of air being thus continued after the heating device is stopped, the introduced air will effectively cool down the heating device 12C.

We now describe the operation of the exhaust gas purifier of the present invention with reference to the control charts in FIGS. 6(*a*)–6(*c*). FIG. 6(*a*) depicts the ON-OFF timing in the control of air introduction by controller 13C; FIG. 6(b) depicts the ON-OFF timing in the control of the heating device by controller 13C; and FIG. 6(c) depicts the ON-OFF timing in the control of the air pump and the control valve by controller 13C.

When the engine start switch is turned on to start engine 1C, controller 13C applies an electric current to both air pump 8C and heating device 12C while, at the same time, it opens control valve 10C. The application of electric current to both air pump 8C and control valve 10C is via delay control device 21C. As a consequence, heated air is introduced into the exhaust pipe 6C at the point upstream of the catalyst.

When the heated air is thus introduced into the exhaust pipe 6C, the temperature of the catalyst 7C is elevated in the same manner as in the prior art, namely, by the heat of the hot air and by the heat of reaction that develops when HC, CO, etc. in the exhaust gas undergo oxidative reaction with the oxygen in the heated air. If, as shown in FIG. 6(a), engine 1C is brought to stop, whereby the control power supply is turned off or if the present condition control signal to controller 13C is turned off since the state of the running of the engine satisfies the present conditions, then the controller 13C stops controlling the heating device 12C as shown in FIG. 6(b), thereby causing the heating device 12C to stop heating. The time at which the heating device is stopped is indicated by A in FIG. 6.

If the controller 13C thus causes the heating device 12C to stop heating, the associated control signal is fed to the delay control device 21C which then starts to perform delay control on both air pump 8C and control valve 10C. Stated more specifically, the delay control device 21C maintains both air pump 8C and control valve 10C in a specified state so that the introduction of air is continued for the specified time indicated by $T_1$ in FIG. 6(c) and, after the passage of time $T_1$, the delay control device 21C causes those members to stop introducing air.

To cease the introduction of air, air pump 8C is brought to stop by cutting off the application of electric current after the passage of time $T_1$ (as indicated by B in FIGS. 6(a)–6(c)) while, at the same, control valve 10C is closed.

Thus, the air introducing means composed of air pump 8C, control valve 10C, etc. continues to introduce air even after the heating device is brought to stop and the introduced air deprives heat from the heating device 12C to cool it down.

EXAMPLE 2C

Example 1C concerns the case where delay control device 21C is provided as a separate entity from controller 13C but, if desired, delay control device 21C may be incorporated in the controller 13C. Alternatively, a control circuit that performs the same function as the delay control device 21C may be assembled into each of air pump 8C and control valve 10C. Whichever method is used, the result is comparable to that attained in Example 1C.

As described on the foregoing pages, the engine exhaust gas purifying apparatus of the present invention comprises the air introducing means for introducing air at a point upstream of the catalyst in the exhaust pipe and the heating device for heating said air, and said air introducing means is connected to the control unit that allows said means to continue the introduction of air for a specified time after the heating device no longer performs heating. Since the air introducing means continues to introduce air even after the heating device stops operating (for example, after about 40 sec, in case of 1 Kw, and 100 L/min.), the heating device is deprived of heat by the introduced air and eventually cools down.

Hence, one can prevent the heating device and surrounding devices or parts from becoming hot after the introduction of heated air is suspended and, as a result, their thermal deterioration is effectively prevented to enhance their durability.

What is claimed is:

1. An apparatus for purifying an exhaust gas of an engine, comprising:

an exhaust pipe, an air introducing means for introducing air at a point upstream of a catalyst in said exhaust pipe, a heating device inserted in a path of air, introduced via said air introducing means, to heat the air, and a control unit, connected to said air introducing means and to said heating device, which controls said air introducing means to continue introduction of air for a specified time after said control unit terminates operation of said heating device.

* * * * *